United States Patent
Park et al.

(10) Patent No.: US 11,564,532 B2
(45) Date of Patent: Jan. 31, 2023

(54) BLENDER

(71) Applicant: LG ELECTRONICS INC., Seoul (KR)

(72) Inventors: Seungje Park, Seoul (KR); Jea Shik Heo, Seoul (KR); Younseok Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 201 days.

(21) Appl. No.: 16/986,486

(22) Filed: Aug. 6, 2020

(65) Prior Publication Data

US 2021/0045581 A1    Feb. 18, 2021

(51) Int. Cl.
*A47J 43/046*     (2006.01)
*A47J 43/07*      (2006.01)
*A47J 43/08*      (2006.01)

(52) U.S. Cl.
CPC ......... *A47J 43/0465* (2013.01); *A47J 43/085* (2013.01)

(58) Field of Classification Search
CPC .. A47J 43/0465; A47J 43/085; A47J 43/0761; A47J 43/0766; A47J 43/0777; A47J 43/046; A47J 43/07; A47J 43/0722; A47J 43/0772
USPC ........................................ 366/205, 206, 314
See application file for complete search history.

(56) References Cited

U.S. PATENT DOCUMENTS

| | | | |
|---|---|---|---|
| 4,371,118 A * | 2/1983 | Sontheimer | F16P 3/10 241/37.5 |
| 4,801,782 A * | 1/1989 | Ineson | A47J 36/2466 219/441 |
| 6,097,016 A * | 8/2000 | Hirata | F24C 7/086 219/720 |
| 6,629,492 B1 | 10/2003 | Li | |
| 7,407,320 B1 * | 8/2008 | Lin | A47J 43/0777 241/37.5 |
| 2004/0100862 A1 * | 5/2004 | Arroubi | A47J 43/0716 366/206 |
| 2012/0206995 A1 * | 8/2012 | Wu | F16P 3/08 366/205 |
| 2016/0006435 A1 * | 1/2016 | Reinhart | A47J 31/465 200/600 |

(Continued)

FOREIGN PATENT DOCUMENTS

KR     10-0796634 B1     1/2008
KR     100796634 B1 *     1/2008    ............ A47J 27/004

(Continued)

OTHER PUBLICATIONS

Moon, Kim Translated Patent Publication of KR100796634B1 (Year: 2008).*

*Primary Examiner* — David L Sorkin
(74) *Attorney, Agent, or Firm* — Dentons US LLP

(57) ABSTRACT

Proposed is a blender, in which a blender body operates when closure of the container lid on a container body is detected. In the blender, when the closure of the container lid is detected, power is transmitted from a first inductive coil of the blender body to a second inductive coil of the container body. A transmission module of the container body transmits a signal to a receiving module of the blender body by suing the power transmitted to the second inductive coil. When the signal is received by the receiving module, the blender body detects the closure of the container lid and is operated.

19 Claims, 16 Drawing Sheets

(56) References Cited

U.S. PATENT DOCUMENTS

| | | | |
|---|---|---|---|
| 2017/0095122 A1* | 4/2017 | Hoare | A23N 1/003 |
| 2018/0020875 A1 | 1/2018 | Kolar et al. | |
| 2018/0140138 A1* | 5/2018 | Kim | A47J 43/07 |
| 2018/0146826 A1* | 5/2018 | Mizrahi | A47J 43/042 |
| 2018/0255975 A1 | 9/2018 | Kolar | |
| 2019/0082504 A1* | 3/2019 | Xu | H05B 6/12 |
| 2019/0282024 A1* | 9/2019 | Perentes | A47J 31/3633 |

FOREIGN PATENT DOCUMENTS

| | | |
|---|---|---|
| KR | 100796634 B1 | 1/2008 |
| KR | 10-1626918 B1 | 6/2016 |
| KR | 20-2019-0001840 U | 7/2019 |
| WO | 2018087030 A1 | 5/2018 |
| WO | 2020-191437 A1 | 10/2020 |

\* cited by examiner

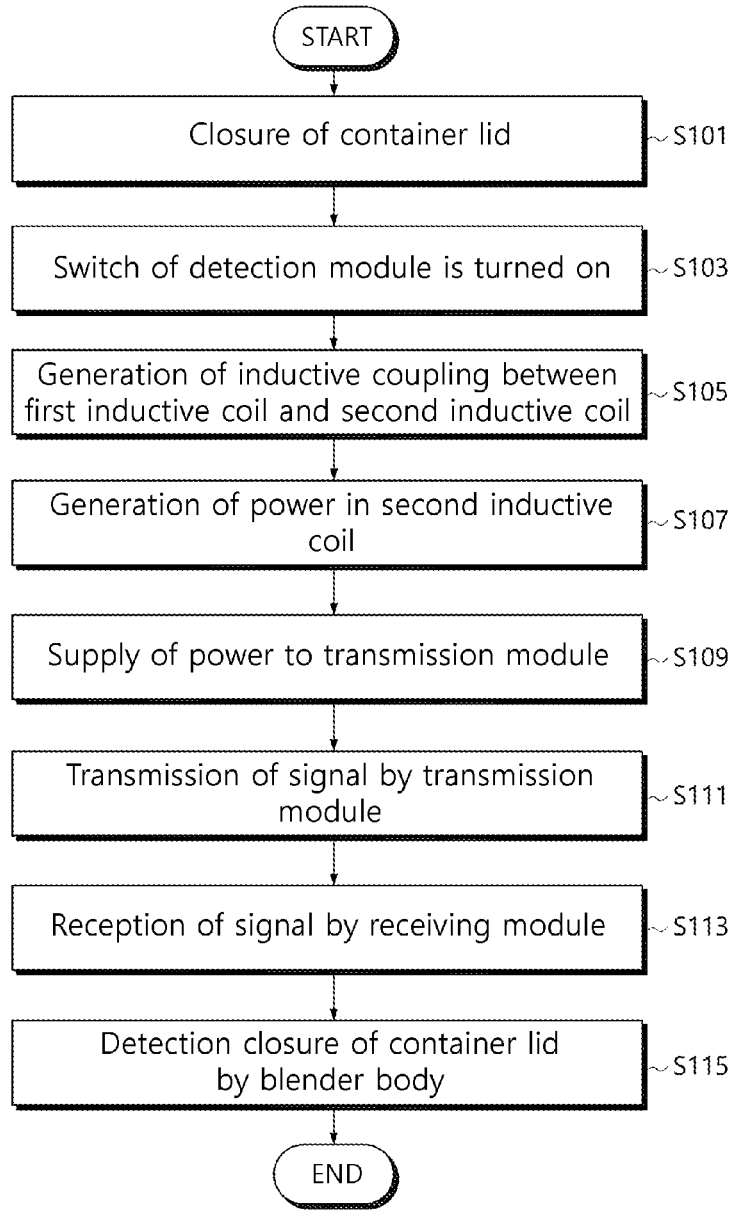

BLENDER

CROSS REFERENCE TO RELATED APPLICATION

The present application claims priority to Korean Patent Application No. 10-2019-0098860, filed Aug. 13, 2019, the entire contents of which is incorporated herein for all purposes by this reference.

BACKGROUND OF THE INVENTION

Field of the Invention

The present disclosure generally relates to a blender. More particularly, the present disclosure relates to a blender, wherein a blender body operates when closure of a container lid is detected.

Description of the Related Art

Generally, a blender is a household appliance that chops or crushes food received in a container body by blades rotated by an electric motor.

In such a blender, the container body is seated on the upper surface of a blender body in which the motor is provided, and when the container body is seated, the blades provided in the container body are connected to a rotating shaft of the motor, and are then rotated.

After a user puts food inside the container body through an open portion of the container body and closes a lid thereof, the user drives the motor by manipulating the blender body to rotate the blades so that food is crushed.

The container lid closes the open portion of the container body to protect food inside the container body. For safety during operation of the blender, the blades are not rotated when the container lid does not close the container body. That is, to prevent accidents due to the blades, the blades are preferably allowed to be rotated only when closure of the container lid is detected.

Conventional methods of detecting the closure of the container lid have been variously proposed.

For example, in prior arts, a push rod physically connecting the container body with the blender body is provided, and when the container lid closes the container body, the container lid presses the push rod. A press detection part of the blender body detects the press, and detects the closure of the container lid.

However, the push rod and the press detection part are required to be separately installed, and the press detection part may be contaminated due to moisture or food that may enter the press detection part.

In addition, the push rod of the container body and the press detection part of the blender body are required to be installed at positions corresponding to each other, so there is a problem that the container body is required to be mounted only in a specific direction.

Furthermore, the push rod is required to be installed along the container body in the longitudinal direction thereof from the container body to the blender body, so the design of the transparent container body is spoiled.

Recently, in order to solve this problem, a technique of detecting the closure of the container lid by the blender body by using wireless communication or electromagnetic coupling between the container body and the blender body has been disclosed.

For example, in European Patent No. EP2548485, when the container lid closes the container body, a blender detecting the closure of the container lid by the blender body by using a wireless communication module is disclosed.

However, in such a prior art, the wireless communication module is required, and a separate power supply is required to be provided in the container body so as to drive the wireless communication module.

For another example, in US Patent Application Publication No. 2018/0020875, an interlocking blending device is disclosed, wherein a transmitting coil and a receiving coil are arranged in a blender body, and a receiving coil and a transmitting coil are arranged in a container body so as to correspond to the transmitting coil and receiving coil, respectively, and when the container lid closes the container body, power is transmitted to the receiving coil of the container body through the transmitting coil of the blender body, and in turn, the power is transmitted to the receiving coil of the blender body through the transmitting coil of the container body, so that the blender body detects the closure of the container lid.

However, in such a prior art, two coils, that is, the transmitting coil and the receiving coil, are required to be installed in each of the blender body and the container body, and a device analyzing power received by the receiving coil of the blender body is required.

Additionally, two coils are arranged in each of the blender body and the container body, and when electric current flows through each coil, induced currents change due to interference between magnetic fields induced in the coils. Accordingly, it is difficult to accurately analyze power received by the receiving coil of the blender body.

Furthermore, power is transmitted from the transmitting coil of the blender body to the receiving coil of the container body, and, due to the closure of the container lid, the power is transmitted from the transmitting coil of the container body to the receiving coil of the blender body. In order to allow the receiving coil of the blender body to receive effective power, high power is required to be transmitted from the transmitting coil of the blender body to the receiving coil of the container body.

In addition, to electrically connect a container lid detection circuit with the blender body, a conductive member is installed along the transparent container body, and thus the design of the transparent container body is spoiled.

Documents of Related Art (Patent Document 1) U.S. Pat. No. 6,910,800
(Patent Document 2) U.S. Pat. No. 7,871,196
(Patent Document 3) EP2548485
(Patent Document 4) US Patent Application Publication No. 2018/0020875

SUMMARY OF THE INVENTION

Accordingly, the present disclosure has been made keeping in mind the above problems occurring in the related art, and the present disclosure is intended to propose a blender in which an inductive coil is arranged in a blender body, and another inductive coil is arranged in a container body, whereby the closure of the container lid is detected by one-time inductive coupling between the two coils.

The present disclosure is intended to propose a blender, in which detection errors or contamination of the blender due to external substances such as water or food is prevented.

The present disclosure is intended to propose a blender, in which the design of the container body made of a transparent material is maintained.

The present disclosure is intended to propose a blender, in which closure of a container lid of the container body is accurately detected with low power.

The present disclosure is intended to propose a blender, in which inductive coils provided in the blender body and the container body are configured to be attached thereto and detached therefrom.

The objectives of the present disclosure are not limited to the above-mentioned objectives, and other objectives not mentioned will be clearly understood by those skilled in the art to which the present disclosure belongs from the following description.

In order to achieve the above objectives, according to one aspect of the present disclosure, there is provided a blender, in which the transmission and reception of a signal are performed between a transmission module provided in the container body and a receiving module provided in the blender body by one inductive coupling between a first inductive coil provided in a blender body and a second inductive coil provided in a container body.

According to the present disclosure, the inductive coupling may be performed between the first inductive coil and the second inductive coil of the container body according to the closure of a container lid of the container body.

According to the present disclosure, power may be generated in the second inductive coil by the inductive coupling between the first inductive coil of the blender body and the second inductive coil of the container body, and the transmission module may transmit the signal to the receiving module by using the generated power.

According to the present disclosure, when a container lid of the container body is closed, a detection module arranged in the container body may detect the closure of the container lid, and when the closure of the container lid is detected by the detection module, the inductive coupling may be performed between the first and second inductive coils.

According to the present disclosure, the detection module provided at the upper portion of the container body may be electrically connected to the second inductive coil provided at the lower portion of the container body by a conductive member made of a transparent material, which is arranged in a longitudinal direction of the container body from the upper portion of the container body to the lower portion thereof.

According to the present disclosure, a transparent electrode film (ITO) may be used as the conductive member, and the conductive member may be arranged in the longitudinal direction of the transparent container body from the upper portion of the container body to the lower portion thereof.

According to the present disclosure, the first end of the transparent electrode film may be electrically connected to the detection module by a first connector which is detachable, and the second end thereof may be electrically connected to the first inductive coil by a second connector which is detachable.

According to the present disclosure, the first inductive coil and the second inductive coil may be concentric in center points thereof, and may be arranged to be parallel to each other by facing each other so that the inductive coupling between the first and second inductive coils is effectively performed.

According to the present disclosure, the first and second inductive coils may be configured to be patterned on the first and second PCB substrates, respectively, so as to be arranged to have simple configuration.

According to the present disclosure, when the container body is mounted to the blender body, the first and second PCB substrates may be provided to be arranged to be parallel to each other to face each other, and the first and second inductive coils patterned on the first and second PCB substrates, respectively, may be provided to be concentric in the center points thereof so that the inductive coupling is effectively performed between the first and second inductive coils.

According to the present disclosure, the first and second PCB substrates may be attached to or detached from the blender body and the container body, respectively, so that the inductive coil is replaced easily and simply.

According to the present disclosure, the transmission module may include a light source emitting light, and the receiving module may include a light sensor receiving the light emitted from the light source so that the transmission and reception of the light are performed even with low power.

According to the present disclosure, when the light sensor receives light, the closure of the container lid may be detected and the blender body may be operated.

The blender of the present disclosure has the following effects.

First, according to the present disclosure, the first inductive coil is arranged at the lower portion of the container body and the second inductive coil is arranged at the upper portion of the blender body, so that only one inductive coupling is performed between the first and second inductive coils according to the closure of the container lid, thereby simplifying control and operation and more effectively preventing interference by a magnetic field defined between inductive coils compared to the prior art.

Second, according to the present disclosure, a module and a device detecting the closure of the container lid are provided inside the container body and the blender body, thereby preventing detection errors or contamination of the blender due to external substances such as water or food.

Third, according to the present disclosure, to perform electrical connection between modules, a transparent electrode film (ITO) is used and arranged on each of the inside and outside of the container body, thereby maintaining the design of the transparent container body.

Fourth, according to the present disclosure, the light source and the light sensor are used in detecting the closure of the container lid, thereby correctly detecting the closure of the container lid with lower power.

Fifth, according to the present disclosure, the first and second inductive coils are patterned on the first and second PCB substrates, respectively, thereby enabling an easy and simple configuration.

Sixth, according to the present disclosure, the first and second inductive coils provided in the blender body and the container body are allowed to be attached thereto and detached therefrom, thereby making the mounting thereof easy and the replacement thereof convenient.

BRIEF DESCRIPTION OF THE DRAWINGS

The above and other objects, features, and other advantages of the present disclosure will be more clearly understood from the following detailed description when taken in conjunction with the accompanying drawings, in which:

FIG. 17 is a flowchart illustrating the process of detecting closure of a container lid by the blender body according to the embodiment of the present disclosure.

DETAILED DESCRIPTION OF THE INVENTION

Figure 1:
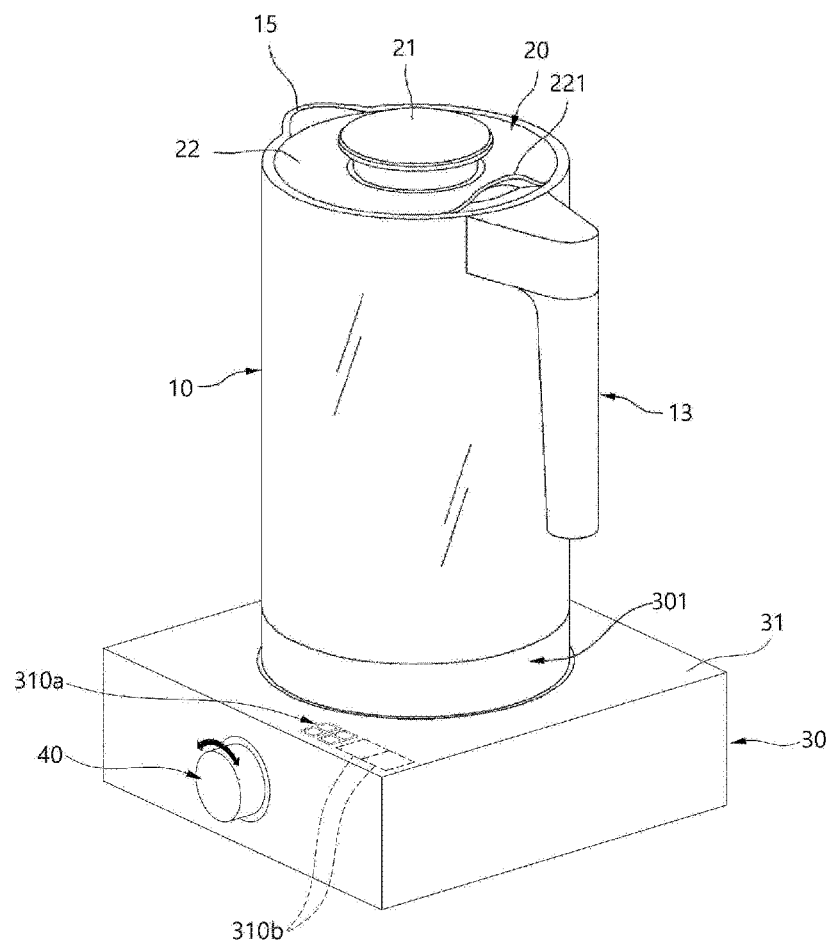
FIG. 1 is a perspective view of the appearance of a blender according to an embodiment of the present disclosure.

Advantages and features of the present disclosure, and methods of achieving them will be clarified with reference to an embodiment described below in detail together with the accompanying drawings. However, the present disclosure is not limited to the embodiment disclosed below, but may be embodied in various forms. The embodiment is provided only to make the present disclosure complete, and to fully inform those skilled in the art to which the present disclosure belongs of the scope of the present disclosure, and the present disclosure is defined by the scope of the claims. The same reference numerals refer to the same components throughout the specification.

Hereinafter, the blender of the present disclosure will be described in detail with reference to the accompanying drawings.

Figure 2:
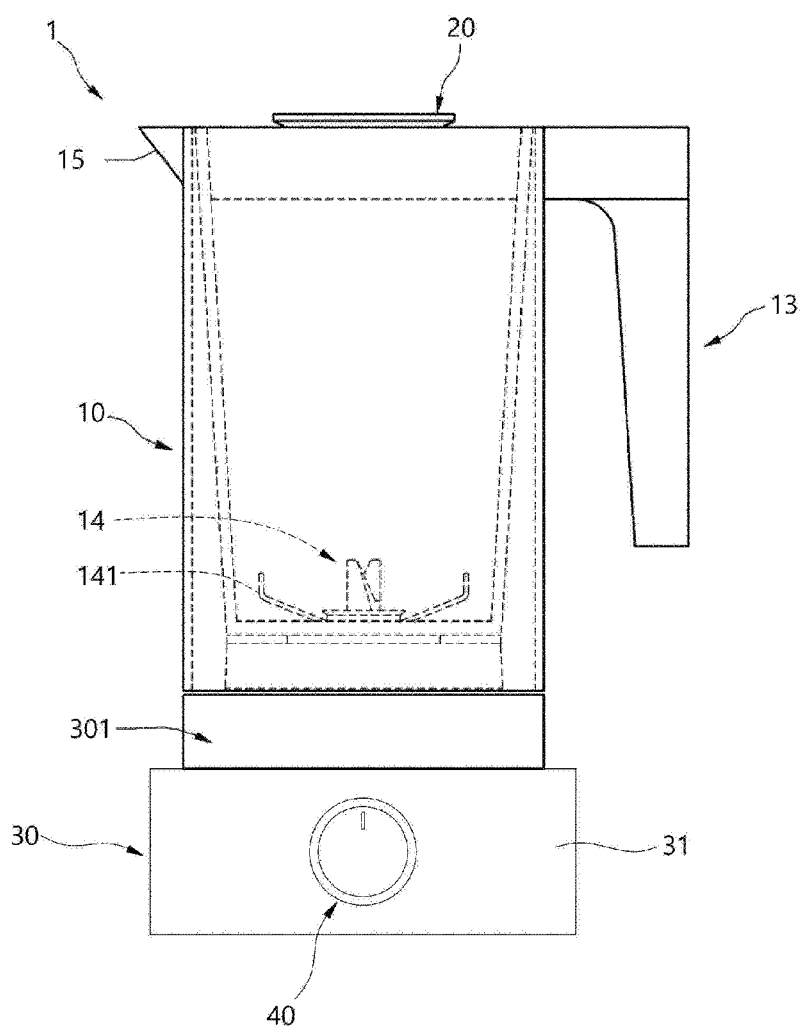
FIG. 2 is a front view of the blender.
Figure 3:
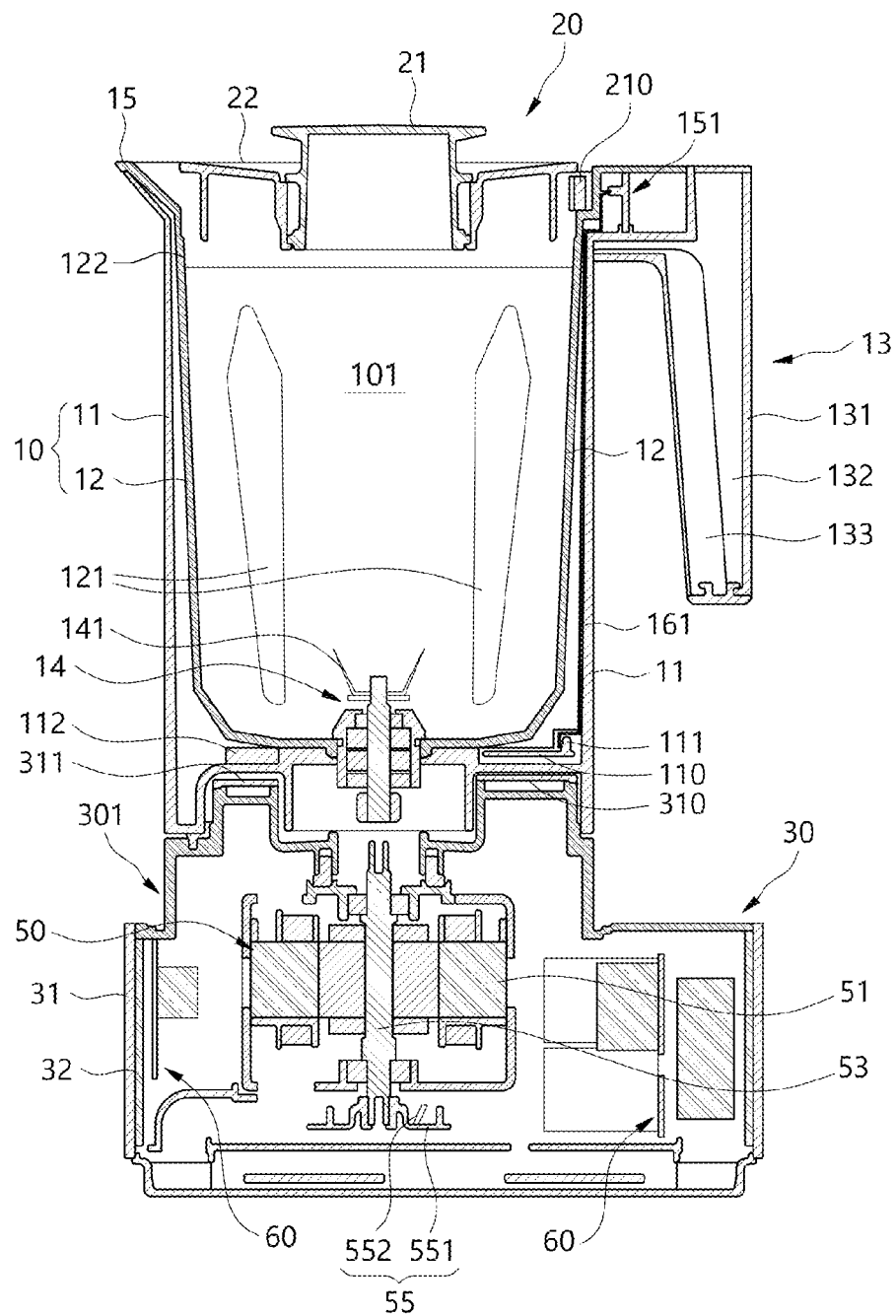
FIG. 3 is a vertical sectional view of the blender.

FIG. 1 is a perspective view of the appearance of the blender according to the embodiment of the present disclosure;

FIG. 2 is a front view of the blender; and FIG. 3 is a vertical sectional view of the blender.

Referring to the drawings, the blender 1 according to the embodiment of the present disclosure may be configured by including a blender body 30 arranged on the bottom surface thereof, and a container body 10 seated on the upper portion of the blender body 30.

For the operation of the blender 1, electrical devices and components, including a motor assembly 50 and a control PCB module 60, may be arranged in the blender body 30.

The blender body 30 may include a manipulation part 310b by which the operation of the blender 1 is controlled, and a display part 310a displaying the operation.

The blender body 30 may be configured in a hexahedral shape as a whole, and a seating part 301 may be provided on the upper surface of the blender body 30 to seat the container body 10. The seating part 301 may be configured such that the container body 10 is attached thereto and detached therefrom in the vertical directions.

The appearance of the blender body 30 may be constituted by an outer casing 31 made of a metallic material or having metallic texture, and the outer casing 31 may be configured in a hexahedral shape having an open lower surface.

An inner casing 32 may be provided in the outer casing 31, and space in which the motor assembly 50 and the control PCB module 60 are mounted may be provided inside the inner casing 32.

A knob 40 may be provided in the front surface of the blender body 30 so that a user sets the operation of the blender 1. The knob 40 protrudes from the front surface of the blender body 30, and is manipulated by being rotated such that the operation of the blender 1 is controlled and set.

The display part 310a may be provided on the upper surface of the blender body 30 to display the operation state of the blender 1. The display part 310a may be configured as at least one seven-segment display.

The manipulation part 310b may be provided on the upper surface of the blender body 30 so as to manipulate the starting and stopping of the operation of the blender 1. To manipulate the blender 1, the manipulation part 310b may include at least one of the knob 40 and a touch module (not shown).

The seating part 301 may be provided on the upper surface of the blender body 30. The seating part 301 may protrude from the upper surface of the blender body 30, and can stably support the container body 10 by a portion of the seating part 301 being inserted to the lower surface of the container body 10.

When the container body 10 is seated on the seating part 301, the motor assembly 50 is coupled to a blade module 14 provided in the container body 10, and can transmit a rotational force to the blade module 14.

The seating part 301 may be formed of the same material as the outer casing 31. The seating part 301 is formed of a metal material or a material having metal texture, so that the appearance of the blender body 30 is overall integrated thereto.

The motor assembly 50 may be mounted to the inner portion of the blender body 30 under the seating part 301. The motor assembly 50 is intended to rotate the blade module 14 provided in the container body 10, and can rotate the blade module 14 at high speed by driving a motor provided therein.

The motor assembly 50 can control the rotational speed of the blade module 14 by controlling the rotational speed of the motor according to the manipulation of the knob 40.

A first coil PCB module 310 may be arranged at a first side of the upper surface of the seating part 301. The first coil PCB module 310 may include a first PCB substrate patterned in the shape of a first inductive coil wound multiple times thereon. The first coil PCB module 310 is connected to the control PCB module 60, and can receive power from the control PCB module 60.

The first PCB substrate may be attached to and detached from the blender body 30. The attachment and detachment of such a first PCB substrate can be performed by the attachment and detachment of the first coil PCB module 310.

In addition, the first PCB substrate and the first inductive coil can be replaced by replacing the first coil PCB module 310.

A receiving module 311 receiving a signal may be provided at a second side of the upper surface of the seating part 301. The receiving module 311 can receive a signal transmitted from the outside, and the received signal can be transmitted to the control PCB module 60.

The upper end of the motor assembly 50 may be connected to the blade module 14 provided in the container body 10. A cooling fan 55 may be provided on the lower end of the motor assembly 50.

The cooling fan 55 has the structure of having multiple fan blades 552 radially arranged on the upper surface of a plate-shaped fan plate 551, and rotates simultaneously with the blade module 14 during the driving of the motor assembly 50 so that air flowing in the direction of the shaft thereof is discharged radially, thereby effectively forcing the flow of cooling air inside the blender body 30.

Multiple control PCB modules 60 may be arranged on the inner wall surface of the inner casing 32 constituting the inner side surface of the blender body 30. The control PCB module 60 may be configured as the multiple control PCB modules, and each of the multiple control PCB modules may be arranged on the circumference of the inner side surface of the blender body 30, that is, on the front, rear, left, and right surfaces thereof.

The control PCB module 60 may include multiple controllers (not shown) capable of controlling the operation of the blender body 30 and the container body 10. These controllers may be provided by mounting a MYCOM (a microprocessor) to a PCB substrate in the form of an on-chip, and may include a program and software necessary for controlling the blender body 30 and the container body 10.

The container body 10 may be configured as a cylindrical shape corresponding to the outer diameter of the seating part 301, and may have an open upper surface, so the container body may have space therein in which food is received.

The container body 10 may be formed of a transparent material such as glass or materials like glass through which the inner portion thereof can be seen.

The container body 10 may have the blade module 14 provided at the center of the internal lower surface thereof. The blade module 14 may include multiple blades 141, and be connected to the motor assembly 50. Accordingly, when the motor assembly 50 is driven while the container body 10 is seated on the blender body 30, the blades 141 are rotated, and can crush or cut food inside the container body 10.

Multiple inner guides 121 may be provided in the container body 10 to guide the food that is rotated. Each of the inner guides 121 may extend by a predetermined length upward from the lower end of the inner side surface of the container body 10.

Meanwhile, a second coil PCB module 110 may be arranged at a first side of the lower end of the container body 10. The second coil PCB module 110 may include a second PCB substrate patterned in the shape of a second inductive coil wound many times. The second coil PCB module 110 and the first coil PCB module 310 may be arranged at positions corresponding to each other up and down. Particularly, the first inductive coil and the second inductive coil may be arranged at positions corresponding to each other.

The second PCB substrate may be attached to and detached from the container body 10. The attachment and detachment of such a second PCB substrate can be performed by the attachment and detachment of the second coil PCB module 110.

In addition, the second PCB substrate and the second inductive coil can be replaced by replacing the second coil PCB module 110.

A transmission module 112 transmitting a signal may be arranged at a second side of the lower end of the container body 10. The transmission module 112 transmits the signal to the outside, and the receiving module 311 receives the signal.

A spout 15 through which crushed food is poured may protrude from the upper end of the container body 10, and a handle 13 may be provided at a side facing the spout 15 by protruding therefrom.

The handle 13 protrudes from the upper end of the container body 10 to the outside, and then extends downward, so that a user can lift or carry the container body 10. The protruding end portion of the handle 13 may be located on the same extension line as the side end of the blender body 30.

A detection module 151 detecting the closure of the container lid 20 may be provided on the inner side of a portion of the container body 10 with which the handle 13 is combined. The detection module 151 may be embodied as a PCB substrate, and include a switch.

The detection module 151 allows the switch provided therein to be operated according to the closure of the container lid 20, and detects the closure of the container lid 20, and then whether to perform inductive coupling between the first and second coil PCB modules 310 and 110 is determined.

That is, when the detection module 151 detects the closure of the container lid 20 on the container body 10, current transmission between the first and second coil PCB modules 310 and 110 is performed, but when the detection module 151 does not detect the closure of the container lid 20, current transmission between the first and second coil PCB modules 310 and 110 is not performed.

The detection module 151 and the second coil PCB module 110 may be electrically connected to each other by a conductive member 161. The conductive member 161 may be connected to the detection module 151 in a first end thereof, and may be connected to the second coil PCB module 110 in the second end thereof by extending from the upper end of the container body 10 to the lower end thereof.

The detection module 151 and the second coil PCB module 110 may have the first and second connectors 152 and 111 provided, respectively, therein for effective electrical connection to the conductive member 161. By using such first and second connectors 152 and 111, the detection module 151 and the second coil PCB module 110 can be easily attached to and detached from the conductive member 161, and the detection module 151, the second coil PCB module 110, and the conductive member 161 are easily attached to and detached from the blender 1, and the replacement thereof can also be easy.

The conductive member 161 may be in contact with the inner surface or the outer surface of the container body 10. When being in contact with the outer surface, the conductive member 161 may be coated with a predetermined coating material to be fixedly attached to the outer surface.

The conductive member 161 is formed of a transparent material so that the design of the container body 10 of the transparent material can be maintained.

The blender 1 according to the embodiment of the present disclosure may include the container lid 20.

The container lid 20 is configured to open and close the open upper surface of the container body 10, and a user can open the open upper surface of the container body 10 by separating the container lid 20 from the container body 10.

The open upper surface of the container body 10 can be closed or opened by closing the container body 10 with the container lid 20 (this is called the closure of the container lid) or by opening the container lid 20 (this is called the opening of the container lid).

The container lid 20 may include a lid handle 21.

A triggering member 210 turning on/off the switch of the second coil PCB module 110 may be arranged on the inner surface of a side of the container lid 20. When the triggering member 210 approaches the detection module 151 within a predetermined distance, the switch provided in the detection module 151 can be turned on.

Meanwhile, as described, the blender 1 according to the embodiment of the present disclosure may be operated by the manipulation of the knob 40 and the manipulation part 310b, but may be configured to be selectively operated only under a specific condition.

For example, the blender 1 of the present disclosure can be operated only in the state in which the container lid 20 closes the container body 10, that is, the state of the closure of the container lid. This is because when the blender 1 operates in the open state of the container lid, accidents may occur due to the blades 141, which are sharp, and food contained in the container body 10 may be ejected to the outside.

Figure 4:
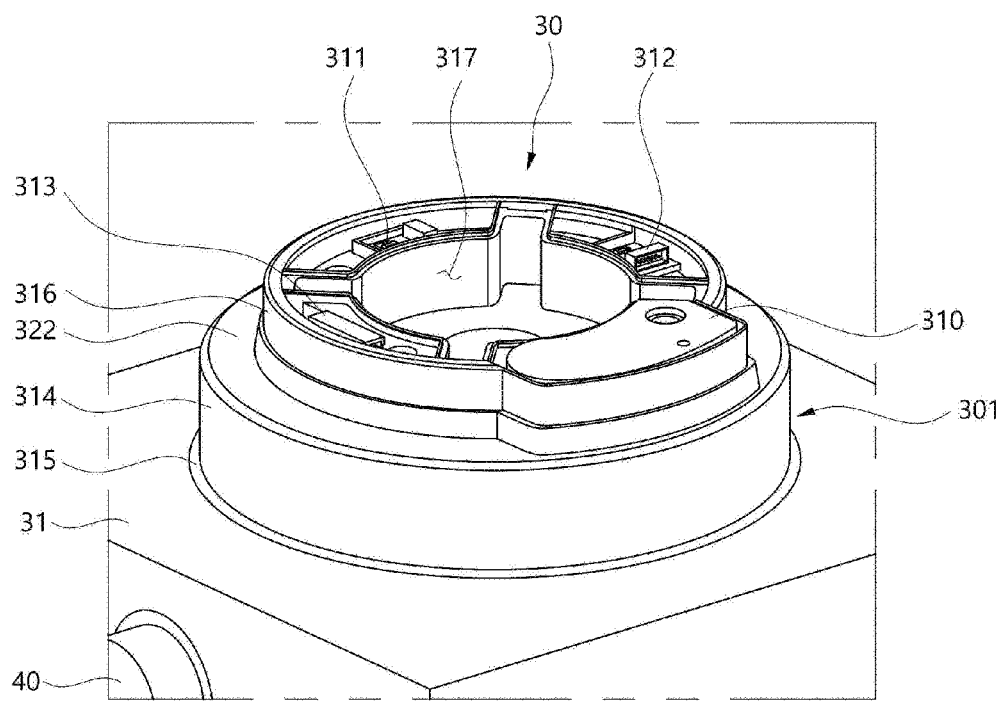
FIG. 4 is a perspective view of a blender body, which is an element of the blender, according to the embodiment of the present disclosure.
Figure 5:
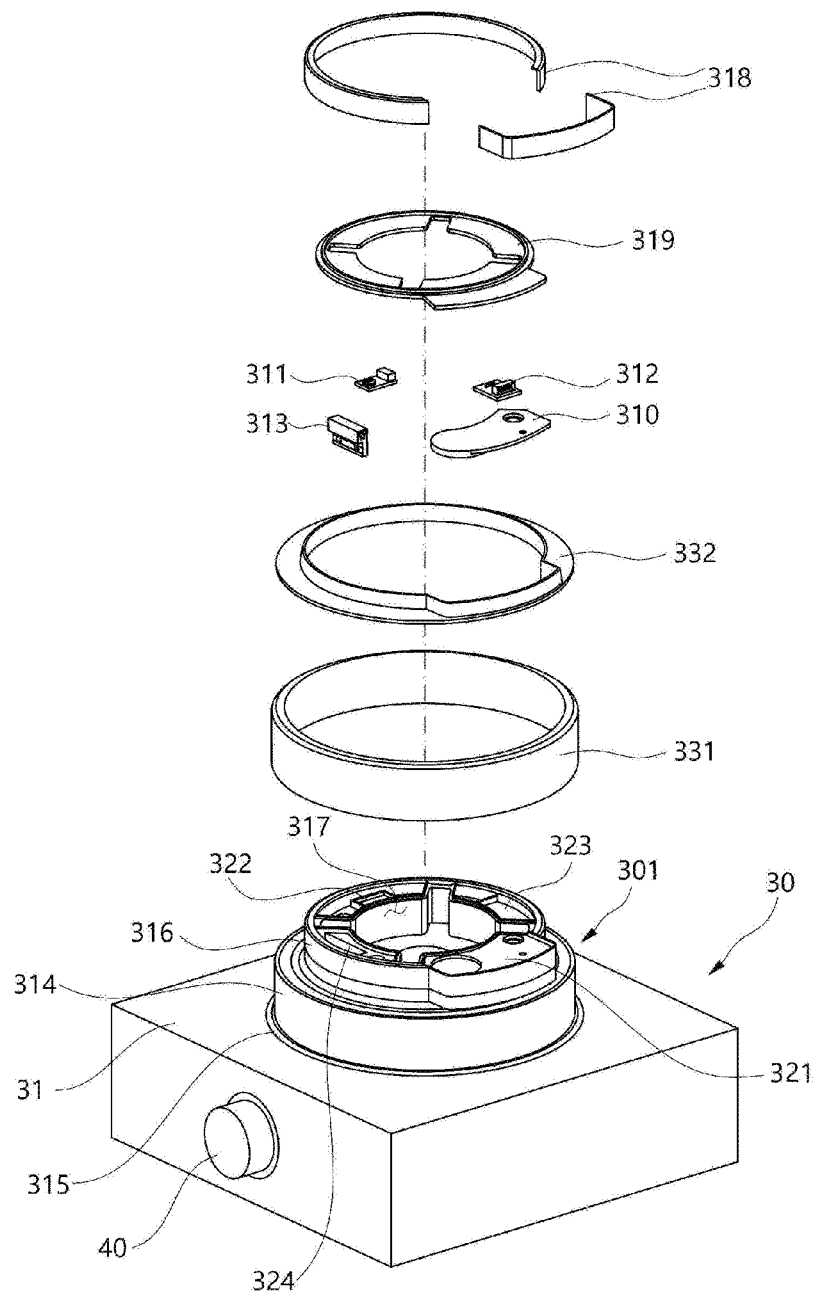
FIG. 5 is an exploded perspective view of the blender body.

FIG. 4 is a perspective view of the blender body, which is an element of the blender, according to the embodiment of the present disclosure, and FIG. 5 is an exploded perspective view of the blender body.

Referring to the drawings, the blender body 30 according to the embodiment of the present disclosure may be configured in a cuboid shape, and may have the structure in which the seating part 301 is provided on the upper surface of the blender body 30 by protruding therefrom to seat the container body 10, and the knob 40 by which the operation of the blender 1 is controlled is arranged at the front surface of the blender body 30.

As for the overall structure of the blender body 30, the outer casing 31 is mounted to the outer side of the blender body 30 to constitute the appearance of the blender body 30. The outer casing 31 may be formed of a metal material such as stainless steel, and may be formed of materials having plate shapes, which are bent and joined to each other, thereby providing the shape of a very clean and rigid appearance.

The seating part 301 has a two-step shape, and the entire appearance thereof may be constituted by a first seating part 314, a second seating part 316, and a lower part 315.

The first seating part 314 and the second seating part 316 may be formed of the same material as the outer casing 31 or of a material having the same texture as the outer casing 31.

The lower part 315 may be formed of a plastic or rubber material, and may be formed in a ring shape. Furthermore, during the mounting of the first seating part 314, the lower part 315 fills space between the first seating part 314 and the outer casing 31 so that no gap is visible.

A first exterior material 331 may be mounted to the circumference of the side surface of the first seating part 314. Such a first exterior material 331 may be formed of a stainless material and may protect the first seating part 314.

The first seating part 314 and the second seating part 316 have predetermined heights and may be formed in ring shapes as a whole when viewed from the top. The second seating part 316 may have a smaller diameter than the first seating part 314, and may be arranged at the center of the first seating part 314.

A seating packing may be arranged at the outskirt of the second seating part 316 arranged at the center of the upper surface of the first seating part 314. The seating packing is intended to give a sense of stability when the container body 10 is seated on the seating part 301, and may be formed of, for example, a rubber material or a silicone material.

The second seating part 316 has a circular shape on the whole when viewed from the top, and a portion of the second seating part 316 may be configured to protrude laterally.

An insertion space 317 may be provided in the center of the upper surface of the second seating part 316, and a first seating groove 321 and a second seating groove 322 may be formed in the circumference of the upper surface of the second seating part 316. A third seating groove 323 and a fourth seating groove 324 may be selectively formed in the upper surface of the second seating part 316.

The first coil PCB module 310 may be seated in the first seating groove 321, and the receiving module 311 may be seated in the second seating groove 322. A Hall sensor 312 detecting the type of the container body 10 seated on the blender body 30 may be seated in the third seating groove 323, and a reed switch 313 detecting whether the container body 10 is seated may be seated in the fourth seating groove 324.

The first coil PCB module 310, the receiving module 311, the Hall sensor 312, and the reed switch 313 may be attached to and detached from the first, second, third, and fourth seating grooves 321, 322, 323, and 324, respectively.

When the container body 10 is seated on the blender body 30, the Hall sensor 312 can detect the type of the container body 10 by detecting magnet (not shown) attached to the lower portion of the container body 10 according to the type of the container body 10. The magnet for each type of container bodies has a different magnetic force, so the type of the container body 10 can be detected by using the magnitude of a magnetic force detected by the Hall sensor 312.

When the container body 10 is seated on the blender body 30, the reed switch 313 detects a magnet (not shown) mounted to the lower portion of the container body 10, and can detect whether the container body 10 is seated thereon. When the magnet approaches the reed switch 313, the reed switch 313 is turned on, and can detect the approaching of the magnet. The reed switch 313 can detect the seating of the container body 10 by detecting the approaching of the magnet.

While the first coil PCB module 310, the receiving module 311, the Hall sensor 312, and the reed switch 313 are selectively seated, a cover 114 may be coupled to the upper portion of the second seating part 316.

The cover 114 secures and protects the first coil PCB module 310, the receiving module 311, the Hall sensor 312, and the reed switch 313, wherein the receiving module 311 may be formed of a material having a signal penetration function so as to receive a signal through the cover 114.

While the cover 114 is coupled to the second seating part 316, a second exterior material 318 may be mounted to the circumference of each of the side surfaces of the cover 114 and the second seating part 316.

Figure 6:
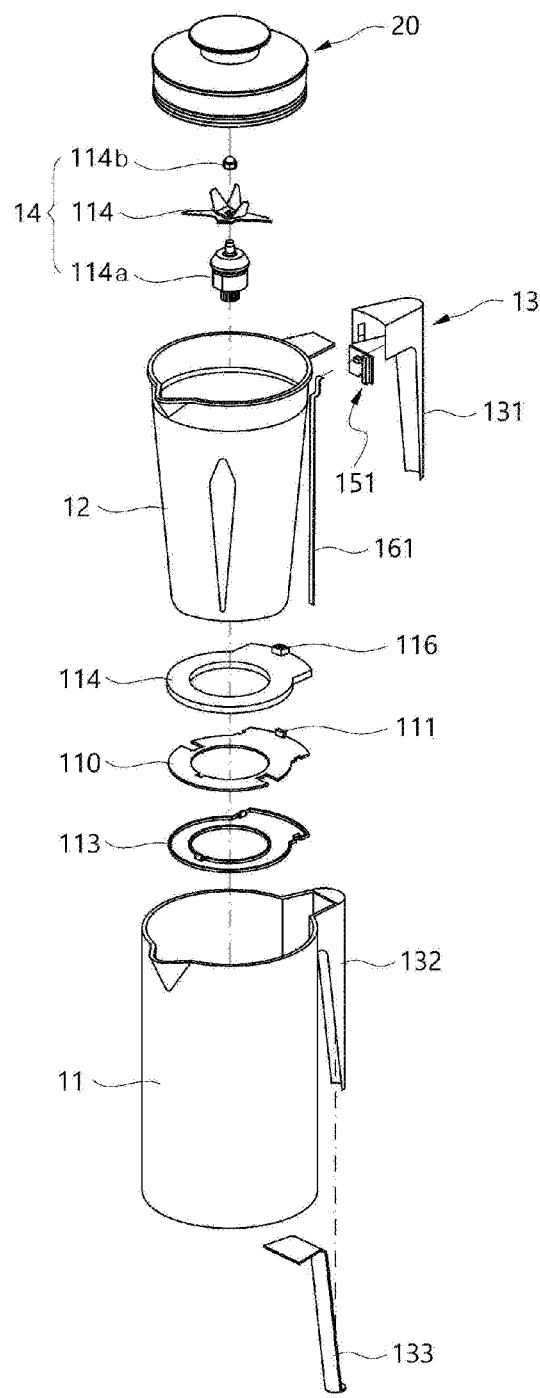
FIG. 6 is an exploded perspective view of a container body, which is an element of the blender, according to the present disclosure.
Figure 7:
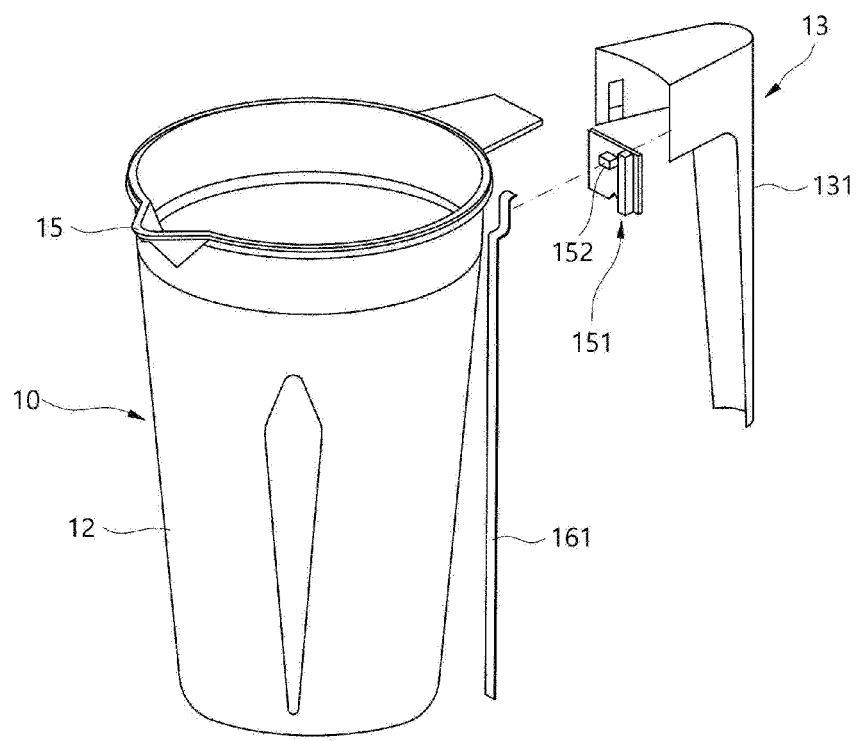
FIG. 7 is a perspective view of an inner container body according to the present disclosure viewed from a different angle.
Figure 8:
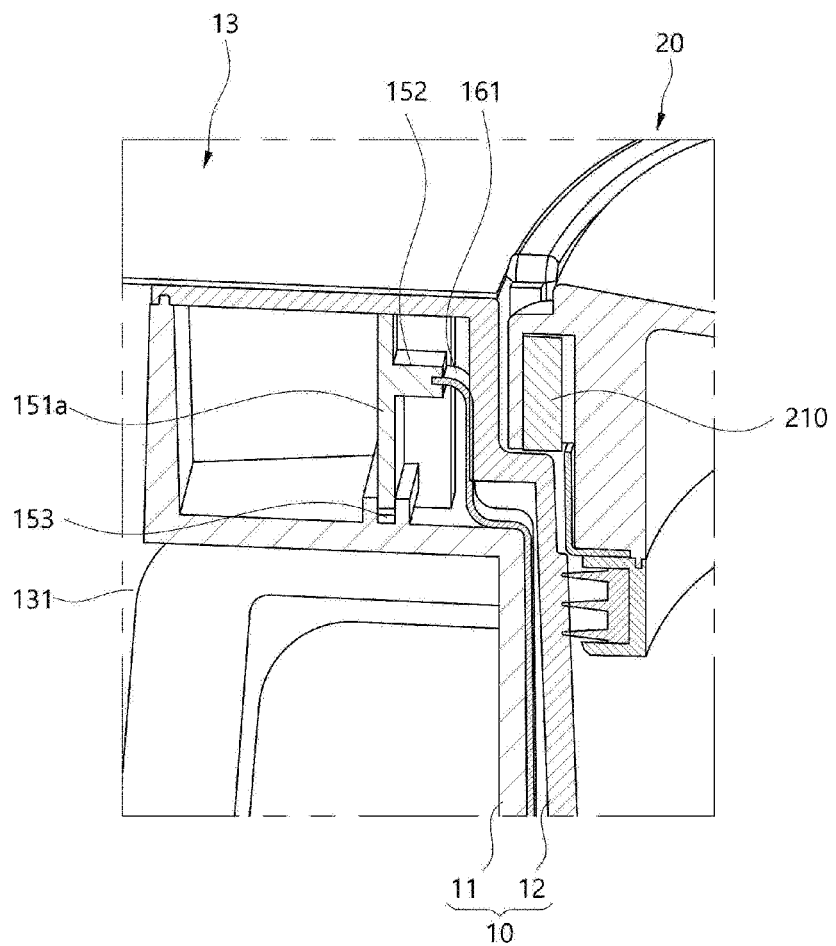
FIG. 8 is the detailed view of the arrangement of a detection module of the container body.
Figure 9:
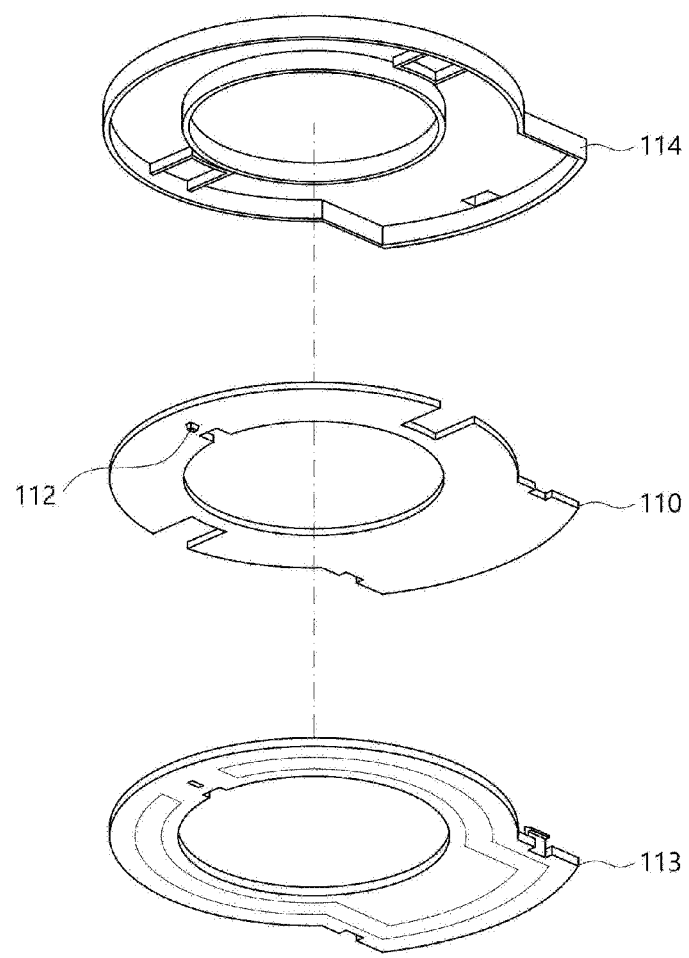
FIG. 9 is an exploded perspective view of a second coil PCB module of the container body viewed from below.

FIG. 6 is an exploded perspective view of the container body, which is an element of the blender, according to the present disclosure; FIG. 7 is a perspective view illustrating the coupled structure of an inner container body and a handle cover viewed from a different side; FIG. 8 is the detailed view of the arrangement of the detection module of the container body; and FIG. 9 is an exploded perspective view of the second coil PCB module of the container body viewed from below.

Referring to the drawings, the container body 10 according to the embodiment of the present disclosure may be configured in a cylindrical shape having the open upper surface. The blade module 14 is mounted to the lower surface of the container body 10, and the container lid 20 may be detachably mounted to the open upper surface of the container body 10.

The container body 10 may be formed of a material such as glass, Tritan, and transparent plastic, etc. to check the state of food therein during the operation of the blender 1.

The container body 10 may include an outer container body 11 constituting the shape of the appearance thereof, and the inner container body 12 having an inner space in which food is received.

The inner container body 12 and the outer container body 11 are coupled to each other, and constitute the overall shape of the container body 10 such that the container body 10 has a double wall structure.

The inner container body 12 is spaced apart from the outer container body 11, which can define space between the outer container body 11 and the inner container body 12. The inner container body 12 may have a diameter becoming smaller downward. The lower portion of the inner container body 12 may be configured to be inclined or round toward the blade module 14 such that food in the container body 10 may be directed to the blade module 14.

The outer container body 11 may have a cylindrical shape having the same outer diameters in the upper and lower ends thereof, so that the appearance of the container body 10 looks neat.

The outer diameter of the outer container body 11 may be configured to be the same as the outer diameter of the seating part 301, and while the container body 10 is mounted to the blender body 30, the blender body 30 and the container body 10 may be seen as being integrated to each other.

A receiving part (not shown) of the blender body may be provided on the lower surface of the outer container body 11. The receiving part of the blender body has a space recessed upward from the lower surface of the outer container body 11 so that the second seating part 316 described above can be inserted into the space. The container body 10 can be maintained to be mounted to the seating part 301 due to the coupling of the receiving part of the blender body and the second seating part 316.

A middle handle 132 may be provided at a side of the upper end of the outer container body 11 by protruding therefrom. When the middle handle 132 is provided by protruding, an inner space may be provided at the side of the upper end of the outer container body 11 to receive the detection module 151.

An outer handle 131 is coupled to the outer side of the middle handle 132 and an inner handle 133 is coupled to the inner side thereof to constitute the handle 13 as a whole.

The inner container body 12 may be configured to have an inclined surface 122 in the upper end thereof, the inclined surface having an inner diameter becoming smaller downward. Accordingly, in the process of being inserted into the open upper surface of the container body 10, the container lid 20 may have the structure of making the inner container body airtight while gradually becoming in close contact with the inner container body 12.

The inclined surface of the upper end of the inner container body 12 may be configured from the upper end of the container body 10 to the upper end of the inner guide 121, and may be configured along the circumference of the inner side surface of the container body 10.

The inner guide 121 may be provided on the inner side surface of the inner container body 12. The inner guide 121 may extend from the inclined surface 122 to the bottom surface of the inner container body 12.

The blade module 14 may be arranged at the lower portion of the inner container body 12 therein. In the blade module 14, the multiple blades 141 may be inserted to the upper portion of a base 141a, and be fixed thereto with a nut 141b.

The second coil PCB module 110 may be arranged under the inner container body 12. As described above, the second coil PCB module 110 may be embodied with the second inductive coil 201 patterned on the same plane as the second PCB substrate. The second inductive coil 201 may be wound multiple times on the PCB substrate in a spiral shape relative to a center point 201a.

The transmission module 112 may be arranged at a side of the lower surface of the second coil PCB module 110. The transmission module 112 and the second inductive coil which is described below may be electrically connected to each other. The transmission module 112 can transmit a signal to the outside when receiving power from the second inductive coil.

The second coil PCB module 110 may be fixedly mounted to a lower plate 113, and while the second coil PCB module 110 is mounted to the lower plate 113, the cover 114 may be coupled to the lower plate 113.

In addition, a second connector 111 may be provided at a side of the upper surface of the second coil PCB module 110 by protruding therefrom to electrically connect the second inductive coil 201 to the conductive member 161.

A receiving part 116 having an open upper surface is provided on the upper surface of the cover 114 by protruding therefrom to receive the second connector 111 provided under the cover 114, and the conductive member 161 is coupled to the second connector 111 exposed through the receiving part 116 to be electrically connected to the second coil PCB module 110.

The detection module 151 may be provided at the inner side of the upper end portion of the container body 10 to which the handle 13 is coupled. The detection module 151 may be embodied in the shape of a PCB, and may include the switch capable of being turned on/off as described below. The switch may be turned on only under a specific condition.

The detection module 151 can detect whether the container lid 20 is closed on the container body 10. Specifically, when the container lid 20 is closed on the container body 10, the switch provided in the detection module 151 may be turned on by the triggering member 210 provided inside the container lid 20.

Accordingly, in the embodiment, the detection module 151 can detect the closure of the container lid 20 when the switch provided in the detection module is turned on.

The detection module 151 may be seated in a groove 153 provided at the lower portion thereof and maintain stability. The detection module 151 may have a first connector 152 provided therein to be electrically connected to the conductive member 161.

The conductive member 161 may be arranged between the outer container body 11 and the inner container body 12. The conductive member 161 may be arranged to extend in the longitudinal direction of the container body 10 from the upper portion of the container body 10 to the lower portion thereof.

The conductive member 161 may be formed of a transparent material to ensure and maintain the transparency of the outer container body 11 and the inner container body 12 formed of materials such as glass, Tritan, and transparent plastic. In the embodiment, the conductive member 161 may include a transparent electrode film (ITO).

The first end of the conductive member 161 can be electrically connected to the detection module 151 by the first connector 152, and the second end of the conductive member 161 can be electrically connected to the second coil PCB module 110 by the second connector 111. In detail, the first end of the conductive member 161 may be connected to the switch provided in the detection module 151, and the second end of the conductive member 161 may be connected to the second inductive coil 201 provided in the second coil PCB module 110.

The conductive member 161 is in contact with the inner surface of the outer container body 11 or the outer surface of the inner container body 12, and may extend from the upper portion of the container body to the lower portion thereof.

The upper end portion of the conductive member 161 may be provided to be bent in some sections depending on the shapes of the outer container body 11 and the inner container body 12.

The triggering member 210 may be provided inside a side surface of the container lid 20 at a position corresponding to the position of the detection module 151. When the container lid 20 is closed on the container body 10, the triggering member 210 may be provided to approach the detection module 151 within a predetermined distance.

When the triggering member 210 approaches the detection module 151 within a predetermined distance, the switch of the detection module 151 can be turned on.

Specifically, when the container lid 20 is closed on the container body 10, the triggering member 210 provided inside the container lid 20 approaches the detection module 151 within a predetermined distance, and the switch of the detection module 151 can be turned on. When the container lid 20 is opened, the triggering member 210 of the container lid 20 is out of the predetermined distance from the detection module 151, and the switch of the detection module 151 can be turned off.

Figure 10:
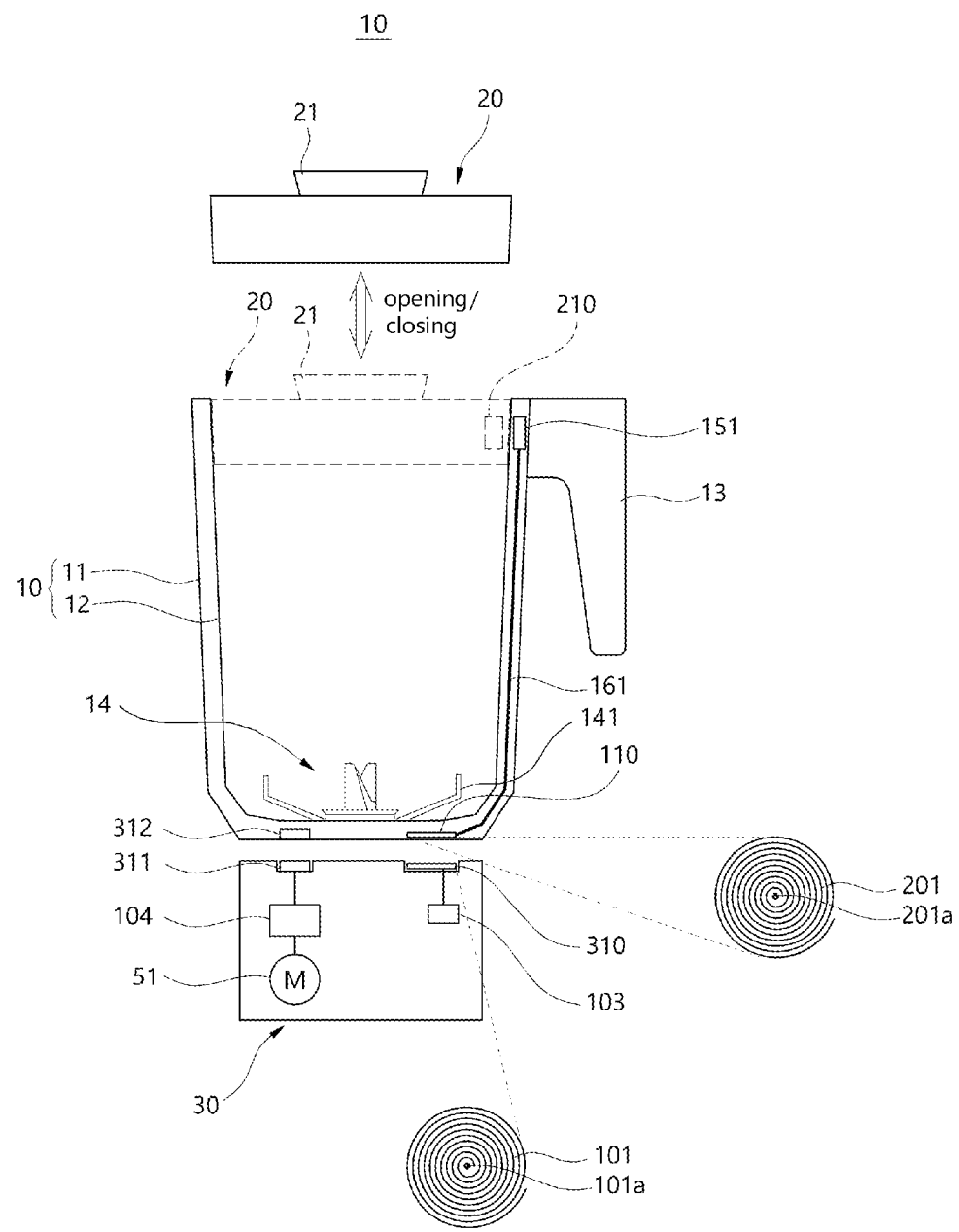
FIG. 10 is a view roughly illustrating some elements of the blender according to the embodiment of the present disclosure.
Figure 11:
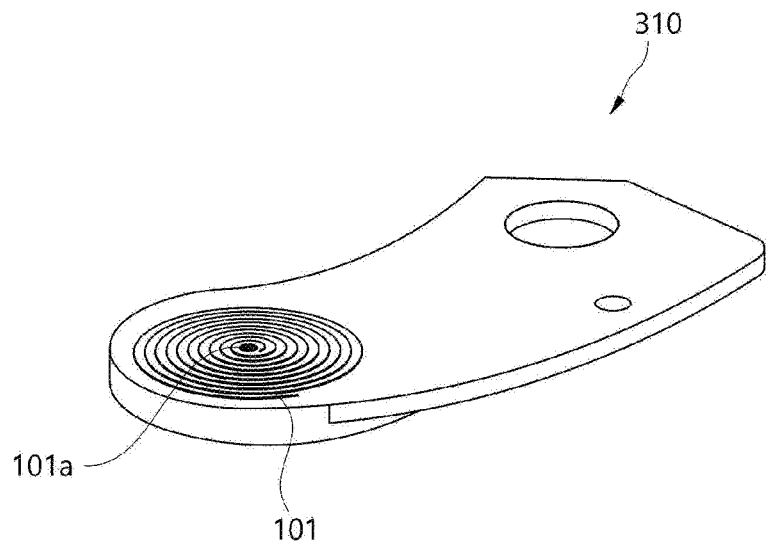
FIG. 11 is the detailed view of an upper surface of a first coil PCB module of the blender body.
Figure 12:
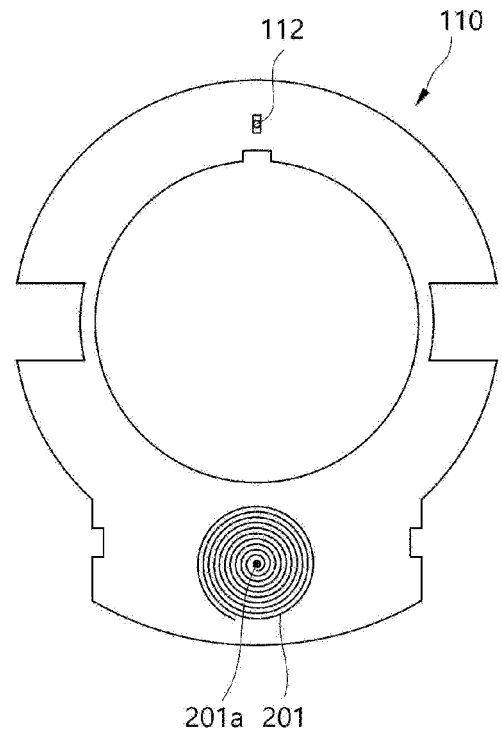
FIG. 12 is the detailed view of a lower surface of the second coil PCB module of the container body.
Figure 13A:
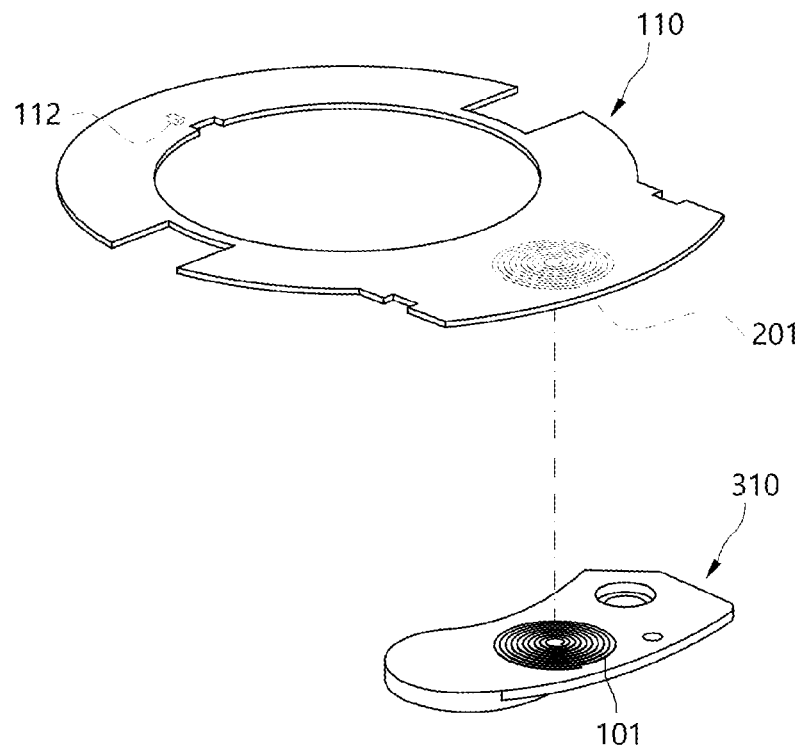
FIGS. 13A and 13B are views roughly illustrating the arranged state of the first and second coil PCB modules.
Figure 13B:
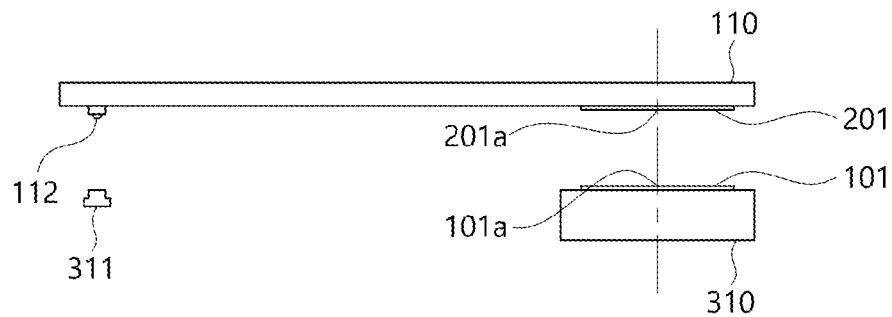

FIG. 10 is a view roughly illustrating some elements of the blender according to the embodiment of the present disclosure; FIG. 11 is the detailed view of the upper surface of the first coil PCB module of the blender body; FIG. 12 is the detailed view of the lower surface of the second coil PCB module of the container body; and FIGS. 13A and 13B are views roughly illustrating the arranged state of the first and second coil PCB modules.

Referring to the drawings, the first coil PCB module 310 may be provided at a side of the upper portion of the blender body 30 of the blender 1 according to the embodiment of the present disclosure.

The first coil PCB module 310 may be embodied with the first inductive coil 101 patterned on the same plane as the first coil PCB module 310. The first inductive coil 101 may be wound multiple times on the first PCB substrate in a spiral shape relative to a center point 101*a*.

The blender body 30 may include a power supply 103 provided therein. The power supply 103 can apply an electric current to the first inductive coil 101. When the electric current is applied to the first inductive coil 101, a magnetic field may be formed in the first inductive coil 101.

The power supply 103 may be mounted to the first coil PCB module 310, or to the control PCB module 60.

The power supply 103 can change the intensity of the current applied to the first inductive coil 101, and the magnetic field of the first inductive coil 101 can be changed due to the change of the current intensity.

The receiving module 311 may be provided at the second side of the upper portion of the blender body 30 so as to receive a signal transmitted from the outside. The receiving module 311 may be arranged to be exposed to the outside so as to receive the signal.

The blender body 30 may include a controller 104 provided therein. The controller 104 may be connected to the motor assembly 50 described above, and can drive the motor 51 of the motor assembly 50 when receiving a signal from the receiving module 311. The controller 104 may be mounted to the control PCB module 60 described above.

The second coil PCB module 110 may be provided at a first side of the lower surface of the container body 10.

The second coil PCB module 110 may be embodied with the second inductive coil 201 patterned on the second PCB substrate. The second inductive coil 201 may be wound multiple times on the PCB substrate in a spiral shape relative to the center point 201*a*.

As the embodiment illustrated in the drawings, the first inductive coil 101 of the blender body 30 and the second inductive coil 201 of the container body 10 may be arranged at a predetermined interval at positions corresponding to each other when the container body 10 is seated on the blender body 30.

When the container body 10 is seated on the blender body 30, the first inductive coil 101 and the second inductive coil 201 are concentric in the two center points 101*a* and 201*a*, and may be arranged to be parallel to each other by facing each other.

The inductive coupling may be selectively performed between the first inductive coil 101 and the second inductive coil 201 under a specific condition.

When the intensity of an electric current applied to the first inductive coil 101 changes, the magnetic field in the first inductive coil 101 is changed, and a magnetic flux passing through the second inductive coil 201 is changed due to the inductive coupling between the first inductive coil 101 and the second inductive coil 201, so an induced electromotive force may be generated in the second inductive coil 201.

The positions and arrangement of the first and second inductive coils 101 and 201 may be determined such that the inductive coupling is appropriately performed therebetween.

The container body 10 may include the transmission module 112 provided at the second side of the lower portion thereof, the transmission module transmitting a signal to the outside. In the embodiment, the transmission module 112 may be provided at the side of the lower surface of the second coil PCB module 110.

The second inductive coil 201 of the second coil PCB module 110 and the transmission module 112 may be electrically connected to each other, and the transmission module 112 can receive power from the second inductive coil 201 and transmit a signal.

The transmission module 112 can transmit the signal to the receiving module 311 of the blender body 30. The receiving module 311 can receive the signal transmitted by the transmission module 112.

The transmission module 112 and the receiving module 311 may be arranged at positions facing each other such that the transmission and reception of the signal are efficiently performed therebetween.

In the embodiment, the transmission module 112, for example, may include a light source emitting light, and the receiving module 311 may include a light sensor detecting the emitted light. The light source may include an LED light source, and the light sensor may be embodied as a semiconductor device, a photodiode, or a phototransistor, etc.

The detection module 151 may be provided on the upper end portion of the container body 10. In the embodiment, the detection module 151 may be provided between the outer container body 11 and the inner container body 12 on the upper end portion of the container body 10. The detection module 151 may be embodied in the form that the switch 151a to be described later is mounted to the PCB substrate.

The triggering member 210 may be provided at a side of the side surface of the container lid 20. When the container lid 20 is closed on the container body 10, the triggering member 210 may be arranged to approach the detection module 151 within a predetermined distance at height substantially equal to the height of the detection module 151.

The switch 151a of the detection module 151 can be turned on when the container lid 20 is closed on the container body 10 and the triggering member 210 of the container lid 20 approaches within a predetermined distance. Accordingly, the detection module 151 can perform the function of detecting the closure of the container lid.

In the embodiment, the triggering member 210 may be a magnetic material, and the switch 151a may be a reed type switch.

In the embodiment, the reed switch is maintained to be initially off, and then can be turned on when the magnetic material approaches the reed switch within the predetermined distance.

The detection module 151 and the second coil PCB module 110 can be connected to each other by the conductive member 161 made of a transparent material. Specifically, the conductive member 161 of a transparent material can electrically connect the switch 151a of the detection module 151 to the second inductive coil 201 of the second coil PCB module 110.

In the embodiment of the present disclosure, the conductive member 161 may include the transparent electrode film (ITO). The transparent electrode film (ITO) is a transparent material, and may be a material that can conduct electric current.

The transparent electrode film (ITO) may be provided at various positions. As in this embodiment, the transparent electrode film may be provided between the outer container body and the inner container body 11. Preferably, the transparent electrode film may be attached to the inner surface of the outer container body 11 or to the outer surface of the inner container body 11.

For another example, the transparent electrode film (ITO) may be attached to the outer surface of the outer container body 11. In this case, the transparent electrode film (ITO) is coated with a transparent coating material so that the transparent electrode film is protected from the outside.

The transparent electrode film (ITO) may be arranged in the longitudinal direction of the container body 10 from the detection module 151 of the upper portion of the container body 10 to the second coil PCB module 110 of the lower portion of the container body 10. Due to the application of such a transparent electrode film (ITO), the transparency of the container body 10 of a transparent material can be maintained.

Meanwhile, the second inductive coil 201, the switch 151a, and the transmission module 112 are electrically connected in series to each other. Accordingly, the supply of power from the second inductive coil 201 to the transmission module 112 according to the turning on/off of the switch 151a can be performed and stopped.

In this case, when power is supplied from the second inductive coil 201 to the transmission module 112, a conversion module 204 may be selectively included to convert the power into power which can be used in the transmission module 112. The conversion module 204 may be mounted to the second coil PCB module 110.

When the transmission module 112 uses power generated from the second inductive coil 201 as it is, the conversion module 204 may not be arranged. In the embodiment, the conversion module 204 converts an alternating current voltage generated in the second inductive coil 201 into a direct current voltage required for the transmission module 112, and supplies the direct current voltage.

Figure 14:
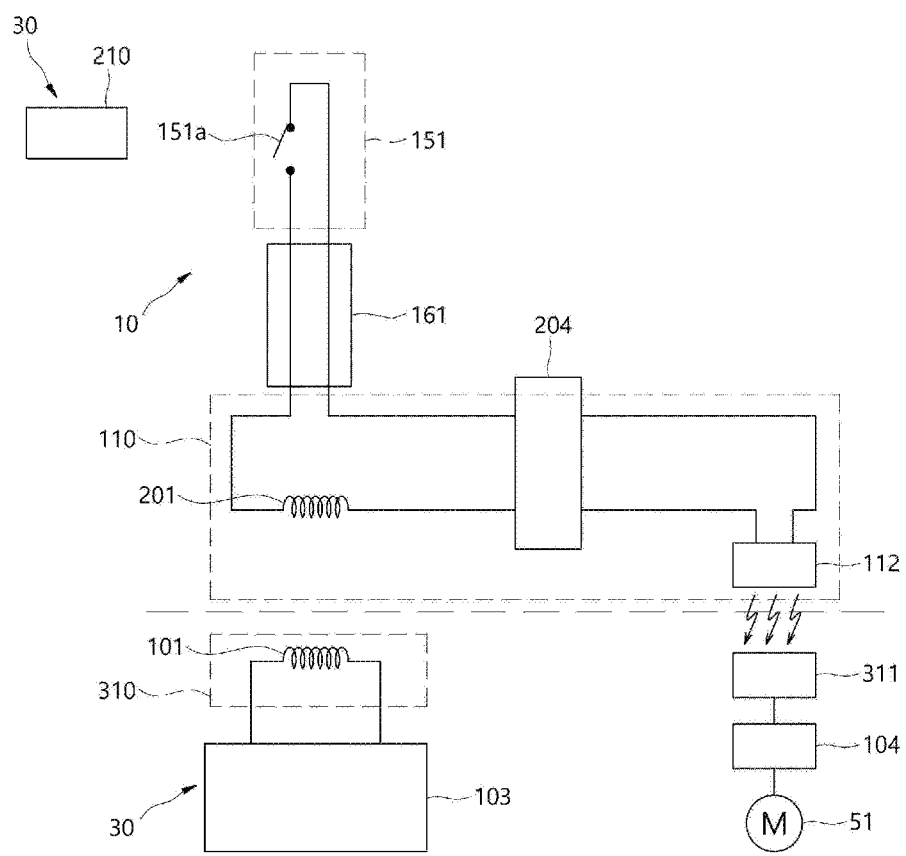
FIG. 14 is a view illustrating an example of an equivalent circuit diagram of the blender of FIG. 10.
Figure 15:
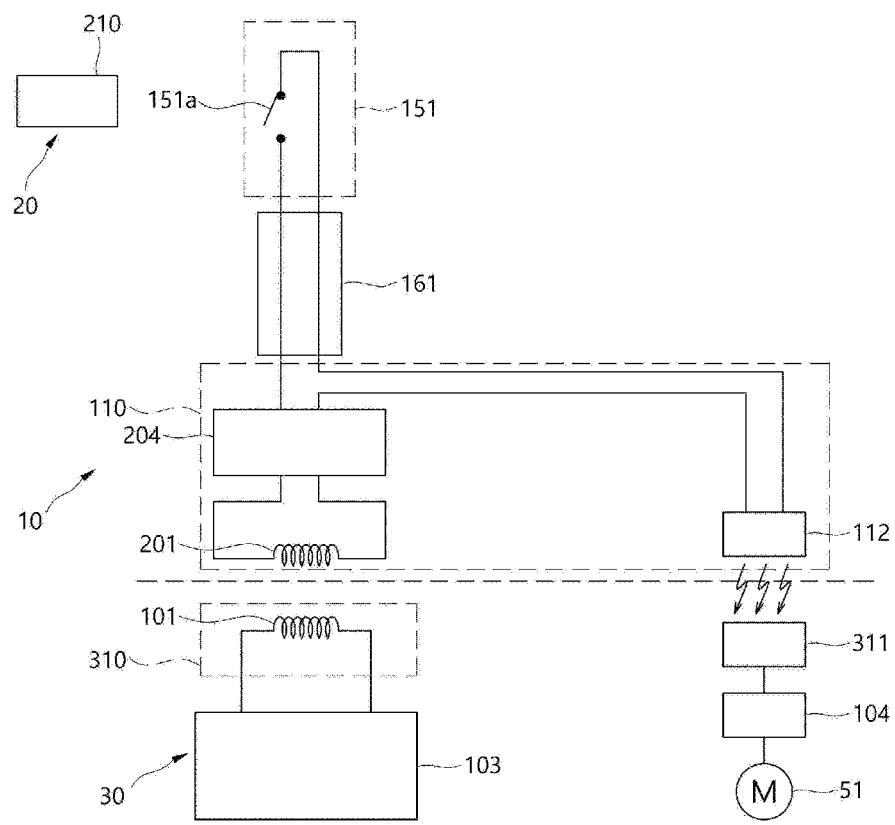
FIG. 15 is a view illustrating another example of the equivalent circuit diagram of the blender of FIG. 10.

FIG. 14 is a view illustrating an example of the equivalent circuit diagram of the blender of FIG. 10, and FIG. 15 is a view illustrating another example of the equivalent circuit diagram of the blender of FIG. 10.

Referring to the drawings, in the blender body 30, the first inductive coil 101 may be connected to the power supply 103, and the receiving module 311 may be connected to the controller 104 and the motor 51.

The power supply 103 supplies an electric current to the first inductive coil 101, and the magnetic field may be formed in the first inductive coil 101 by the supplied electric current.

The intensity of the electric current supplied to the first inductive coil 101 from the power supply 103 is controlled, so the change of the magnetic field of the first inductive coil 101 can be induced.

In the container body 10, the second inductive coil 201 may be connected to the detection module 151 and the transmission module 112. The second inductive coil 201 may be connected to the transmission module 112 and the detection module 151 selectively through the conversion module 204.

In this case, in the embodiment, the connection between the second inductive coil 201 and the detection module 151 may be performed by the conductive member 161 of a transparent material.

The detection module 151 may include the switch 151a. In the embodiment, such a switch 151a may include the reed switch.

The operation of the blender will be described by an equivalent circuit diagram.

When the container lid 20 is not closed on the container body 10, the detection module 151 does not detect the triggering member 210, and the switch 151a is maintained to be turned off.

When the switch 151a is turned off, the second inductive coil 201, the switch 151a, and the transmission module 112 do not form a closed circuit, so the inductive coupling is not performed between the first inductive coil 101 and the second inductive coil 201.

When the container lid 20 is closed on the container body 10, the triggering member 210 is in the state of approaching the detection module 151 within a predetermined distance, and the switch 151a can be turned on by the triggering member 210.

When the switch 151a is turned on, a closed circuit can be formed between the second inductive coil 201, the switch 151a, and the transmission module 112, which are connected to each other in series.

Accordingly, when the closed circuit is formed, the inductive coupling is performed between the first inductive coil 101 and the second inductive coil 201, and power induced in the second inductive coil 201 can be supplied to the transmission module 112.

The transmission module 112 can transmit a signal to the outside according to the supply of the power. Accordingly, the receiving module 311 may receive the signal transmitted by the transmission module 112.

As illustrated in the drawings, as required, the power induced in the second inductive coil 201 is selectively converted to power required for the transmission module 112 by the conversion module 204, and the converted power can be supplied to the transmission module 112.

FIGS. 14 and 15 are views in which the position of the conversion module 204 is illustrated differently.

When the receiving module 311 receives a signal, the signal can be transmitted to the controller 104. The controller 104 can drive the motor 51 only when the closure of the container lid is detected due to the reception of such a signal.

Accordingly, in the embodiment, in the state of the opening of the container lid, the receiving module 311 cannot receive the signal, so the controller 104 does not drive the motor 51. The receiving module 311 can receive the signal only in the state of the closure of the container lid, so the controller 104 can drive the motor 51.

Accordingly, the blender 1 may be allowed to be operated only under the specific condition of the closure of the container lid.

Figure 16:
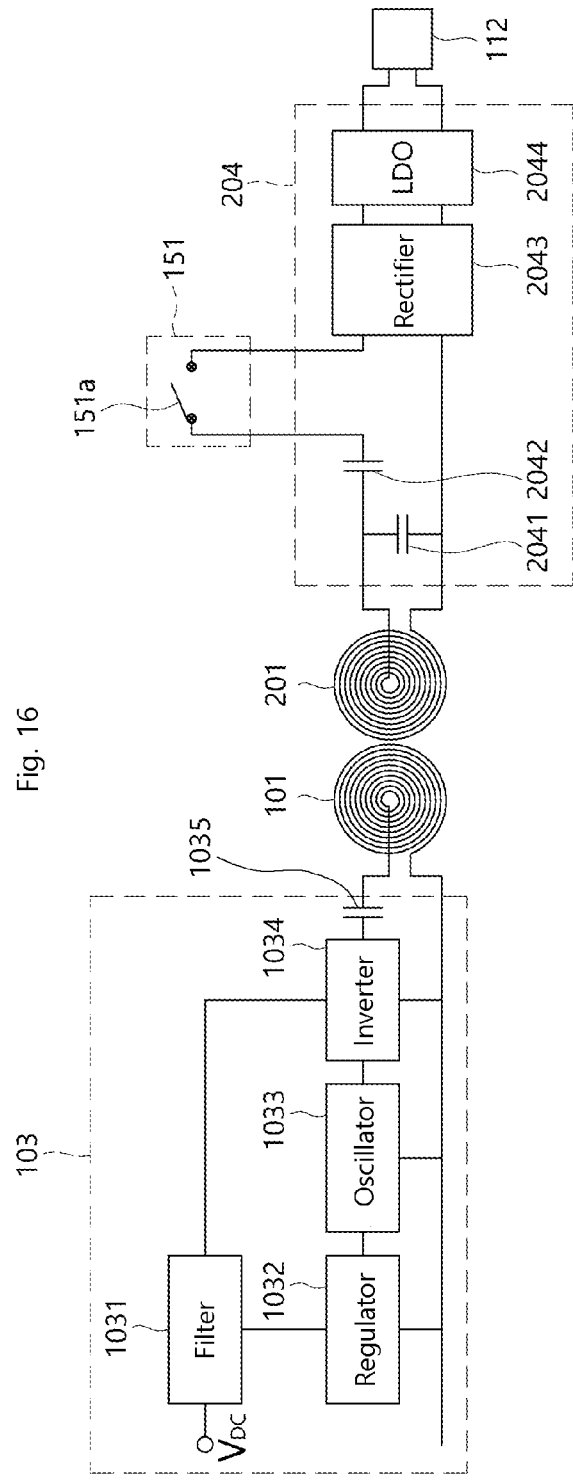
FIG. 16 is a detailed circuit diagram of FIG. 14.

FIG. 16 is a detailed circuit diagram of FIG. 14.

Referring to FIG. 16, the power supply 103 according to the embodiment of the present disclosure may include a filter 1031, a regulator 1032, an oscillator 1033, and an inverter 1034.

The filter 1031 can remove noise included in $V_{dc}$ input from the power supply (not shown) inside the blender body 30, and the $V_{dc}$ from which noise is removed can be input to the inverter 1034. In the embodiment, the filter 1031 can output $12V_{dc}$.

The regulator 1032 outputs the $V_{dc}$ by converting the $V_{dc}$ output from the filter 1031 into a lower $V_{dc}$. In the embodiment, the regulator 1032 outputs the $V_{dc}$ by lowering $12V_{dc}$ to $5V_{dc}$.

The oscillator 1033 can generate a pulse for an AC signal with respect to the DC voltage output from the regulator 1032. In the embodiment, the oscillator 1033 can generate a pulse of 345 kHz.

The inverter 1034 can change the $V_{dc}$ output through the filter 1031 into an alternating current (AC) voltage by turning on/off of the switch according to the pulse of the AC signal, and supply the AC current to the first inductive coil 101.

In the embodiment, the AC current is applied to the first inductive coil 101, and the magnetic field formed in the first inductive coil 101 is changed. Due to the change of the magnetic field, the inductive coupling is performed between the first inductive coil 101 and the second inductive coil 201.

The conversion module 204 may include a rectifier 2043 and an LDO part 2044.

The rectifier 2043 may convert the AC power induced in the second inductive coil 201 into DC power.

When the DC power output from the rectifier 2043 is unstable due to various factors, the LDO part 2044 stabilizes the output DC power, and supplies the stabilized DC power to the transmission module 112. In this embodiment, the LDO part 2044 may control such that the actual output value of DC power follows a reference output value.

The transmission module 112 can transmit the signal to the outside with the received DC power.

The switch 151a of the detection module 151 can open and close the circuit between the second inductive coil 201 and the transmission module 112. The power induced in the second inductive coil 201 can be transmitted to the transmission module 112 only when the switch 151a is turned on.

A capacitor 1035 and the first inductive coil 101 of the power supply 103, and capacitors 2041 and 2042 and the second inductive coil 201 of the conversion module 204 can constitute a resonator.

FIG. 17 is a flowchart illustrating the process of detecting the closure of the container lid by the blender body according to the embodiment of the present disclosure.

Referring to FIG. 17, in the embodiment, when the container lid 20 is closed on the container body 10 at S101, the switch 151a of the detection module 151 can be turned on by the triggering member 210 provided inside the side surface of the container lid 20 at S103.

When the switch 151a is turned on, the switch 151a, the second inductive coil 201, and the transmission module 112 forms a closed circuit, and the inductive coupling can be performed between the first inductive coil 101 and the second inductive coil 201 at S105.

Due to such inductive coupling, power can be generated in the second inductive coil 201 at S107, and the generated power can be supplied to the transmission module 112 at S109.

The transmission module 112 can transmit a signal by using the supplied power at S111, and the receiving module 311 can receive the signal at S113.

Accordingly, when the receiving module 311 receives the signal, the controller 104 of the blender body 30 can detect the closure of the container lid at S115.

The embodiment of the present disclosure has been described above with reference to the accompanying drawings, but the present disclosure is not limited to the above embodiment, and may be manufactured in various forms. People having ordinary knowledge in the technical field to which the present disclosure pertains will understand that the present disclosure can be implemented in other specific forms without changing the technical spirit or essential features of the present disclosure. Therefore, it should be understood that the embodiment described above is illustrative in all respects and not restrictive.

What is claimed is:

1. A blender comprising:
a blender body having a first inductive coil and a receiving module to receive a signal;
a container body having a second inductive coil selectively and inductively coupled to the first inductive coil, and a transmission module to transmit the signal, and
a container lid to open and close an open upper surface of the container body,
wherein transmission and reception of the signal are performed between the transmission module and the receiving module by using power generated by the inductive coupling between the first inductive coil and the second inductive coil,
wherein the container body comprises a detection module to detect a closure of the container lid,
wherein the detection module is electrically connected to the second inductive coil by a conductive member, the conductive member being formed of a transparent material and being arranged to extend in the longitudinal direction of the container body from an upper portion of the container body to a lower portion thereof.

2. The blender of claim 1, wherein the power is generated in the second inductive coil by the inductive coupling between the first inductive coil and the second inductive coil.

3. The blender of claim 2, wherein the transmission module transmits the signal by receiving the power generated in the second inductive coil.

4. The blender of claim 1, wherein the container lid has a triggering member provided inside a side surface thereof,
wherein the inductive coupling is performed between the first inductive coil and the second inductive coil according to the closure of the container lid of the container body.

5. The blender of claim 4, wherein the detection module detects the triggering member,
wherein when the triggering member is detected by the detection module, the inductive coupling is performed between the first and second inductive coils.

6. The blender of claim 5, wherein the detection module comprises a switch turned on by the triggering member,
wherein when the triggering member approaches the switch within a predetermined distance according to the closure of the container lid, the switch is turned on, so that the inductive coupling is performed between the first and second inductive coils.

7. The blender of claim 1, wherein the conductive member comprises a transparent electrode film (ITO).

8. The blender of claim 7, wherein a first end of the transparent electrode film (ITO) is electrically connected to the detection module by a first connector which is detachable, and a second end of the transparent electrode film (ITO) is electrically connected to the second inductive coil by a second connector which is detachable.

9. The blender of claim 1, wherein the second inductive coil, the switch, and the transmission module are connected in series to each other, and when the switch is turned on, the second inductive coil, the switch, and the transmission module form a closed circuit.

10. The blender of claim 1, wherein each of the first and second inductive coils are wound multiple times on a same plane in a spiral shape relative to a center point thereof.

11. The blender of claim 10, wherein the first and second inductive coils are configured to be patterned on first and second PCB substrates, respectively.

12. The blender of claim 11, wherein the first and second PCB substrates are provided to be parallel to each other so as to face each other when the container body is mounted to the blender body, and the first and second inductive coils patterned on the first and second PCB substrates are arranged to have respective center points which are concentric to each other.

13. The blender of claim 11, wherein the first PCB substrate is configured to be attachable and detachable from the blender body and the second PCB substrate is configured to be attachable and detachable from the container body.

14. The blender of claim 1, wherein the transmission module comprises a light source emitting light, and the receiving module comprises a light sensor to receive the light emitted from the light source.

15. The blender of claim 14, wherein when the light is received by the light sensor, a motor provided in the blender body is driven.

16. The blender of claim 14, wherein the blender body comprises:
a power supply to apply an electric current to the first inductive coil, and
a controller configured to drive a motor when the light is received by the light sensor.

17. The blender of claim 16, wherein the power supply comprises:
a filter to remove noise included in a direct current (DC) voltage which is input thereto;
a regulator to convert and output the DC voltage output from the filter;
an oscillator to generate a pulse for an AC signal with respect to the DC voltage output from the regulator; and
an inverter to change the DC voltage output through the filter into an alternating current (AC) voltage by turning on/off a switch according to the pulse of the AC signal, and supply the AC current to the first inductive coil.

18. The blender of claim 14, wherein the container body comprises a conversion module to convert a voltage generated by the second inductive coil and supply the voltage to the transmission module.

19. The blender of claim 18, wherein the conversion module comprises:
a rectifier to convert AC power induced in the second inductive coil into DC power, and
a Low Dropout (LDO) part to control such that an actual output value of the DC power output from the rectifier follows a set reference output value.

* * * * *